United States Patent
Masauji et al.

[11] Patent Number: 5,939,853
[45] Date of Patent: Aug. 17, 1999

[54] METHOD AND APPARATUS FOR CONTROLLING A STEPPING MOTOR, AND A RECORDING MEDIUM STORING A PROGRAM FOR CARRYING OUT THE METHOD

[75] Inventors: Mamoru Masauji; Kunio Mizuno, both of Kohnan-machi, Japan

[73] Assignee: Zexel Corporation, Tokyo, Japan

[21] Appl. No.: 08/838,051

[22] Filed: Apr. 22, 1997

[30] Foreign Application Priority Data

Apr. 22, 1996 [JP] Japan ................................ 8-122851

[51] Int. Cl.⁶ .................................................. G05B 19/40
[52] U.S. Cl. ............................................. 318/685; 454/75
[58] Field of Search ................................ 318/685, 696; 454/69–75, 139–165, 228–236, 237–368

[56] References Cited

U.S. PATENT DOCUMENTS

| | | | |
|---|---|---|---|
| 4,759,269 | 7/1988 | Brown et al. ............................. | 454/75 |
| 5,194,043 | 3/1993 | Takahashi et al. ...................... | 454/316 |
| 5,699,857 | 12/1997 | Flaishans et al. ...................... | 165/202 |
| 5,767,651 | 6/1998 | Boillet et al. ........................... | 318/696 |
| 5,873,780 | 2/1999 | Mori et al. .............................. | 454/285 |

*Primary Examiner*—David Martin
*Attorney, Agent, or Firm*—Wenderoth, Lind & Ponack, L.L.P.

[57] ABSTRACT

In the process steps a tentative value (m) of a deviation in a turning angle of a rotor of the stepping motor is determined each time the stepping motor runs. A cumulative amount of the tentative values (m) forms an estimated value (S) of the deviation in the turning angle of the rotor of the stepping motor. This estimated value (S) of the stepping motor. This estimated value (S) of the deviation is stored in a predetermined memory area. When an ignition switch is turned on, it is judged whether or not the estimated value (S) of the deviation thus stored until the ignition switch is turned on, exceeds a predetermined value. When it is judged that such estimated value (S) exceeds the predetermined value, an initial setting of the stepping motor is made.

18 Claims, 9 Drawing Sheets

METHOD AND APPARATUS FOR CONTROLLING A STEPPING MOTOR, AND A RECORDING MEDIUM STORING A PROGRAM FOR CARRYING OUT THE METHOD

BACKGROUND OF THE INVENTION

1. Field of the Invention

The present invention relates to a method and apparatus for controlling a stepping motor, and a recording medium storing a program for carrying out the method, wherein the stepping motor is controlled while the stepping motor serves as a motor actuator for rotatably driving each of various types of air-conditioning doors used in a vehicle air-conditioning unit.

2. Description of the Related Art

As a prior art device of this type, there has been disclosed a control system in Patent Application Publication (KOKOKU) Hei 4-9685, for example.

More particularly, the control system set forth in the above Publication is provided to control the mode door in the vehicle air conditioning system. Such a control system comprises a power supply detecting means for detecting the application of the power supply voltage, a setting means for setting the initial position of the mode door, a pulse generating means for generating the driving pulse signals for the stepping motors to drive the mode door, and a mode door position detecting means for detecting a desired door position of the mode door based on a setting of the mode door switch.

In such a control system, activation of the power supply is detected by the power supply detecting means when the power supply voltage is applied, and then the detection signal is input into the setting means. Meanwhile, a set condition of the mode switch is detected by the mode door position detecting means, and then the detected result is applied to the setting means and the pulse generating means.

When the detection signal is input from the power supply detecting means to the setting means, the predetermined controls signal can be output from the setting means to the pulse generating means in order to generate the driving pulse which is needed to rotate the mode door into its initial position. Such initial position has been decided previously in response to the set position of the mode door switch.

Therefore, the predetermined driving pulse signal needed to rotate the mode door into the initial position is applied from the pulse generating means to the stepping motors. As the result of such drive, the mode door can be set at its initial position.

After this, the driving pulse signal which corresponds to the set position of the mode switch detected by the mode door position detecting means is applied to the stepping motors. As a result, the mode door can be rotated into the position according to the set of the mode switch.

In contrast, in Patent Application Publication (KOKOKU) Hei 6-81552, for example, a control system for detecting the "out-of-step" of the stepping motor has been disclosed.

More particularly, this control system is constructed to comprise a controller, a driver, a command pulse speed detecting circuit, a deviation counter, a decision circuit, and a rotary encoder as a detecting means.

The controller outputs the command pulse, which supplies commands of the rotating angle, the rotating speed, etc. to the stepping motor, to the driver which generates the pulse signal to drive the stepping motor. The driver outputs necessary pulse signals to the stepping motor based on the command pulse.

The command pulse is also input from the controller to the command pulse speed detecting circuit and the deviation counter. In the command pulse speed detecting circuit, the rotating speed of the stepping motor instructed by the command pulse is detected based on the command pulse being input.

The deviation counter receives the command pulse together with the actual information of the rotating speed of the stepping motor, which has been detected by the encoder. In the deviation counter, the deviation between the actual rotating speed and the rotating speed instructed by the command pulse is detected, and then the detected result is input into the decision circuit.

In the decision circuit, it is decided whether or not the output value of the deviation counter exceeds a predetermined value. Then, it is decided whether the output value of the deviation counter has exceeded the predetermined value, and the control signal which can compulsorily terminate the driving of the stepping motor is output from the decision circuit to the driver. Then, the predetermined value in the decision circuit is set according to the set speed of the stepping motor which is detected by the command pulse speed detecting circuit.

However, in the above-mentioned conventional apparatus disclosed in Japanese Patent Publication No. Hei 4-9685, since the initial setting of the position of the air-conditioning door is made each time the electric power supply of the vehicle air-conditioning unit is turned on, i.e., since such initial setting is forcibly made even when it is not required, the conventional apparatus is poor in efficiency. In addition, the conventional apparatus suffers from a strange noise which is often issued from the stepping motor. Namely, in the initial setting of the air-conditioning door, since the air-conditioning door is urged in a single direction, the above-mentioned strange noise is often issued from the stepping motor, which makes a user uncomfortable.

On the other hand, in the conventional technique disclosed in Japanese Patent Publication No. Hei 6-81552, it is necessary to provide an additional detection means, which increases costs of an apparatus for carrying out the conventional technique. More particularly, when the conventional technique is applied to a vehicle air-conditioning unit with a limited space, it is necessary to produce an additional space for housing the detecting means, which requires the vehicle air-conditioning unit to be modified in construction.

SUMMARY OF THE INVENTION

It is an object of the present invention to provide a method and apparatus for controlling a stepping motor, and a recording medium storing a program for carrying out the method.

During operation of the stepping motors, a control unit judges fluctuation in power supply voltage and decides a tentative value of deviation which is defined previously based on the magnitude of the fluctuation in the power supply voltage in order to represent a level of deviation of the air-conditioning door caused in response to the magnitude of the fluctuation in the power supply voltage. The control unit accumulates the tentative value every time the tentative value of deviation is decided in response to the operation of the stepping motors, and stores an accumulated value into a memory as the estimated value of deviation.

Then, at a first start of operation after the power supply has been shut off, if the control unit decides that the estimated value of deviation stored in the memory is in excess of a predetermined value, it can supply predetermined driving pulses to the stepping motors in order to rotate the air-conditioning door into an initial position which is a standard position of the air-conditioning door.

DESCRIPTION OF THE PREFERRED EMBODIMENTS

Hereinbelow, the present invention will be described in detail with reference to the accompanying drawings.

Incidentally, since many changes and modifications can be made to the following construction of the present invention without departing from its spirit, it is intended that all matters given in the following description and the accompanying drawings shall be interpreted to be illustrative only, and not as a limitation to the scope of the present invention.

Now, a first embodiment of the present invention will be descried in detail with reference to FIGS. 1 to 4.

Figure 1:
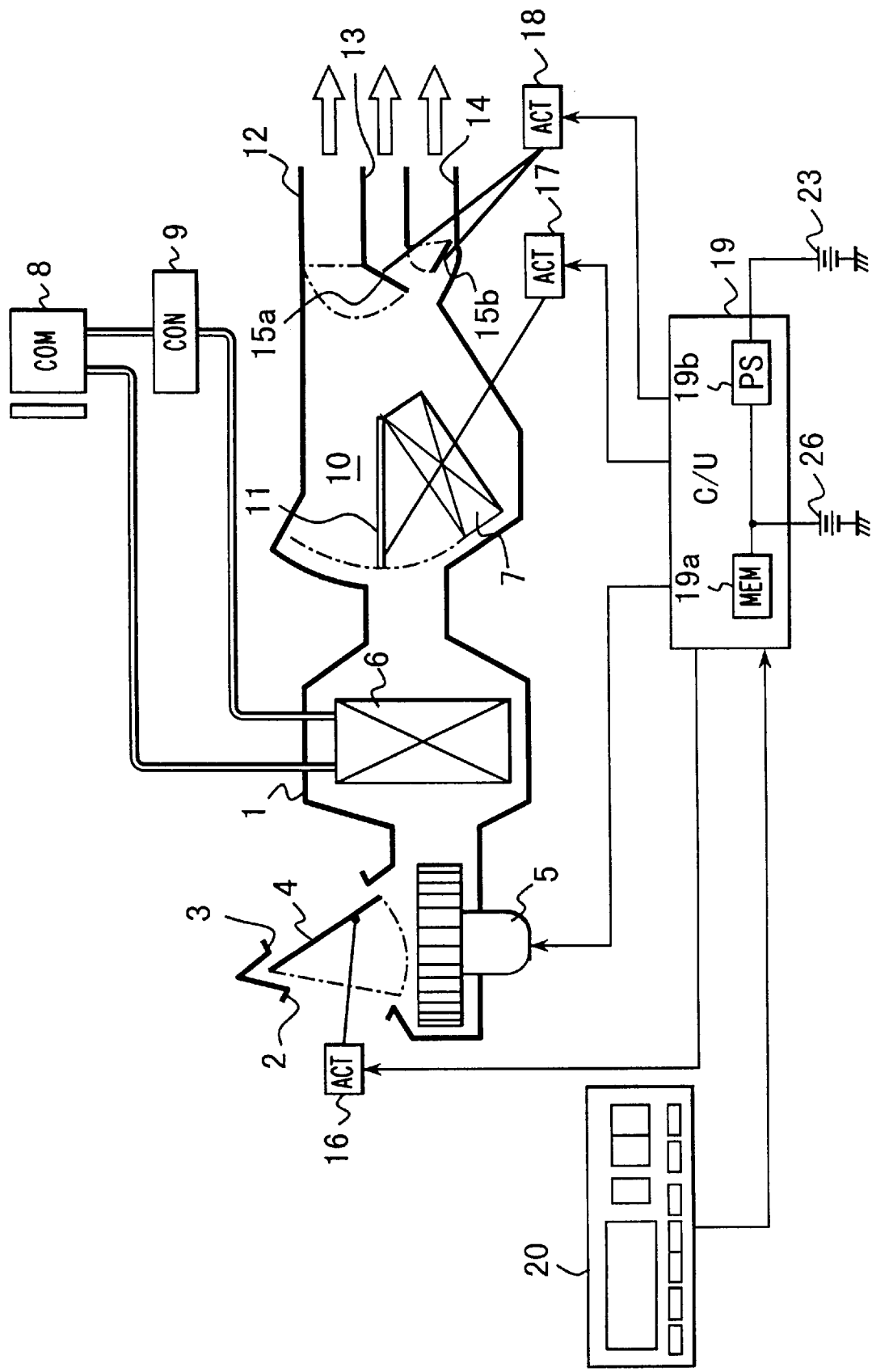
FIG. 1 is a block diagram of the vehicle air-conditioning unit in a first embodiment of the apparatus of the present invention.
Figure 2:
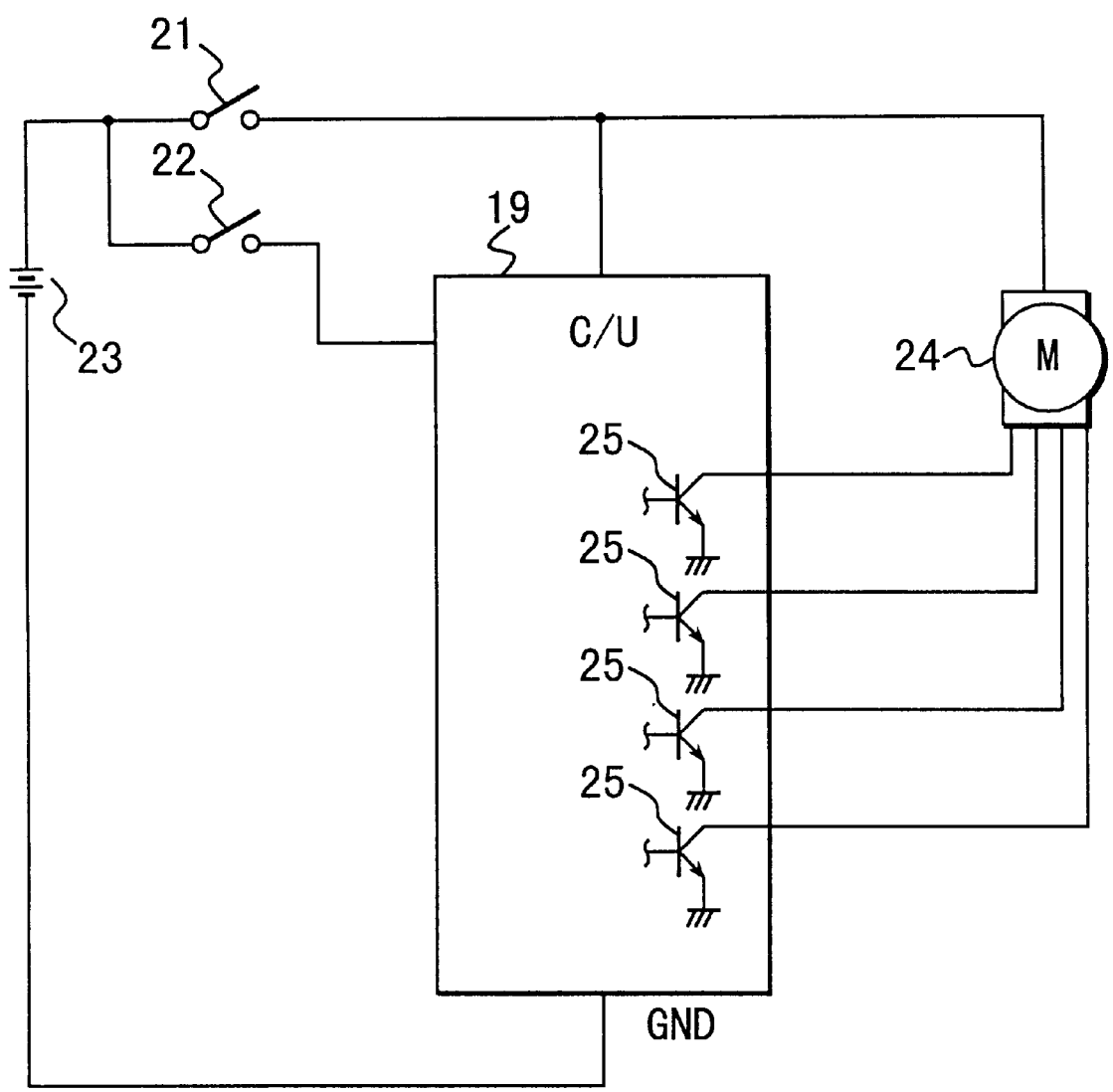
FIG. 2 is a circuit diagram of the stepping motor and its control unit.

As shown in FIGS. 1 and 2, the present invention is directed to a vehicle air-conditioning unit with an air-conditioning door which will be described.

The air-conditioning door comprises: an intake door 4; an air-mixing door 11; and mode doors 15a, 15b.

As shown in FIG. 1, an upstream side of an air-conditioning duct 1 is divided into a fresh-air intake opening 2 and an indoor-air intake opening 3. Provided in such branch portion of the duct between theses intake openings 2, 3 is the intake door 4 which switches its intake air from the fresh air to the indoor air or vice versa.

Sequentially provided in a downstream side of the air-conditioning duct 1 are a blower motor 5, an evaporator 6, and a heater core 7. Incidentally, the evaporator 6 is combined with a compressor 8 and a condenser 9 to form a refrigerant cycle of the vehicle air-conditioning unit.

On the other hand, the heater core 7 is eccentrically mounted in the air-conditioning duct 1 so as to form a by-pass passage 10 between a side wall portion of the duct 1 and the heater core 7. Provided in front of this heater core 7 is the air-mixing door 11 which controls both the amount of air passing through the heater core 7 and that passing through the by-pass passage 10.

A downstream side of the air-conditioning duct 1 is divided into a vent opening 12, a defroster opening 13 and a heater opening 14. All of these openings 12, 13, 14 open into a passenger room of the vehicle, and controlled in opening angle by the mode doors 15a, 15b. The mode door 15a is rotatably mounted in a wall between the openings 12 and 13, while the mode door 15b is rotatably mounted in a side wall portion of the heater opening 14, as shown in FIG. 1.

Each of the intake door 4, air-mixing door 11, and the mode doors 15a, 15b is rotatably driven by a motor actuator constructed of a stepping motor (not shown). More particularly, the intake door 4, air-mixing door 11 and the mode doors 15a, 15b are rotatably driven by motor actuator 16, 17 and 18, respectively.

A control unit 19 is controlled by a user through various operating switches in a control panel 20 mounted in an instrument panel (not shown) of the vehicle, and controls the motor actuators 16, 17, 18 and the blower motor 5 and the like in operation.

Now, a circuit diagram of a stepping motor 24, which is used in each of the motor actuators 16, 17, 18, will be described together with the control unit 19 thereof with reference to FIG. 2. Since the substantially same circuit diagram of the stepping motor 24 may be used for any of the motor actuators 16, 17, 18, only one example of such circuit diagram will be described with reference to FIG. 2.

The control unit 19 (i.e., C/U shown in FIG. 1) is connected with a positive terminal of vehicle battery 23 through an ignition switch 21 and an accessory switch 22, and has its grounded side connected with a negative terminal of the battery 23.

The ignition switch 21 thus having one of its contacts connected with the control unit 19 has the other of its contacts connected with one of the opposite terminals of the stepping motor 24.

In this case, it is not required for the stepping motor 24 to limit the number of excitation poles thereof. A plurality of drive transistors 25 provided in the control unit 19 corresponds in number to the excitation poles of the stepping motor 24. Each of the drive transistors 25 has its collector side connected with a terminal of each of the exciting coils (not shown) provided inside the stepping motor 24.

In a condition in which the ignition switch 21 is closed, the control unit 19 switches on any one of its drive transistors 25 to permit drive pulses to be inputted to the stepping motor 24, whereby an output shaft of the stepping motor produces an angular rotation corresponding to a predetermined number of steps.

Now, a control processing procedure for making an initial setting of a turning angle of the air-conditioning door such as those 4, 11, 15a, 15b driven by the motor actuators 16, 17, 18 will be described with reference to flowcharts shown in FIGS. 3 and 4.

Figure 3:
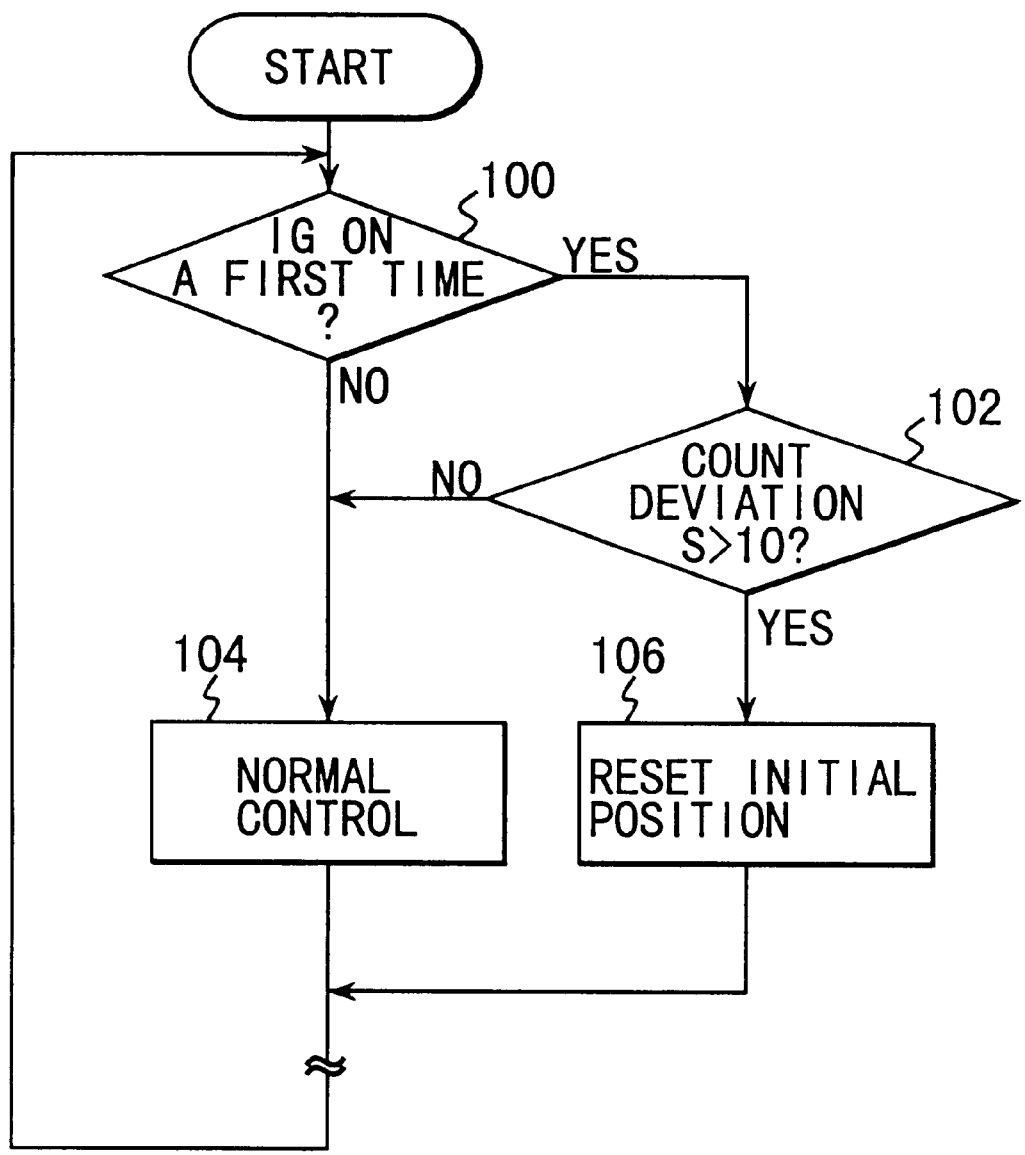
FIG. 3 is a flowchart for a main control routine executed in the control unit of the air-conditioning unit in the first embodiment of the apparatus of the present invention shown in FIG. 1.

First, the flowchart of FIG. 3 illustrating a main routine performed by the control unit 19 will be descried.

When the accessory switch 22 is closed, the control unit 19 is connected with the vehicle battery 23, and, therefore starts its operation.

In the flowchart of the main routine shown in FIG. 3, in a step 100, it is judged whether or not the ignition switch 21 is closed and also judged whether such closure of the ignition switch 21 is of a first occurrence after the control unit 19 starts its operation. When the closure of the ignition switch 21 is judged to be of a first occurrence, step 100 is followed by step 102. When the closure of the ignition switch 21 is judged to not be a first occurrence, step 100 is followed by step 104.

In step 102, it is judged whether or not an estimated value S of a deviation in turning angle of the air-conditioning door, such as the doors 4, 11, 15a, 15b, exceeds a predetermined value, for example, S>10. In this case, the estimated value S of the deviation represents a possible deviation of the turning angle of the air-conditioning door. When the estimated value S of the deviation is judged to exceed 10 in step 102, it is clear that such an air-conditioning door has deviated from its normal turning angle. In this case, since it is necessary to make an initial setting of a turning angle of the air-conditioning door, step 102 is followed by step 106 in which the initial setting of the turning angle of the air-conditioning door is made.

Namely, in this step 106, the stepping motor 24 receives a predetermined number of drive pulses from the control unit 19 to make the initial setting of the turning angle of such an air-conditioning door. After completion of processing in step 106, the processing procedure returns to step 100 through an additional processing if necessary, as shown in FIG. 3, to form a processing loop. Consequently, a series of the above processing steps in this loop are repeated when the air-conditioning unit operates in this embodiment of the apparatus of the present invention.

On the other hand, in step 102, when the estimated value S of the deviation of the turning angle of such an air-conditioning door is judged not to exceed the predetermined value such as 10, step 102 is followed by step 104 which permits the air-conditioning door to be controlled in a normal mode.

Namely, in step 104, the air-conditioning door is controlled, in the normal mode, by the control unit 19 through the motor actuators 16, 17, 18 and other control circuits and the like.

Figure 4:
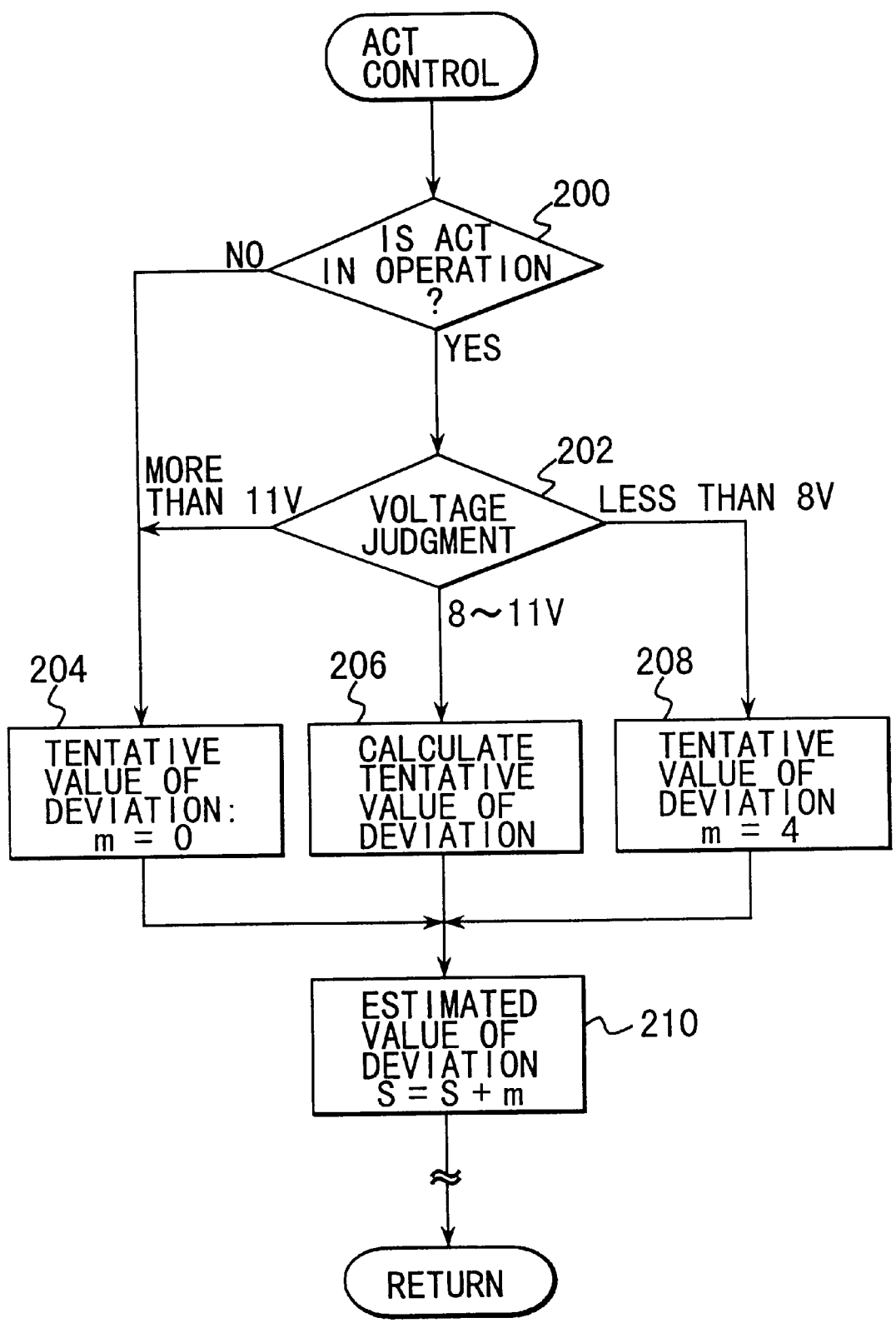
FIG. 4 is a flowchart for a subroutine which is used to determine the estimated value of the deviation and forms a part of the main control routine shown in FIG. 3.

FIG. 4 represents the subroutine of a program for determining the estimated value S of the deviation of the turning angle of the air-conditioning door. This subroutine will be described with reference to its flowchart shown in FIG. 4.

The subroutine of FIG. 4 belongs to step 104 of the main routine shown in FIG. 3.

As shown in FIG. 4. in step 200 in this subroutine, it is judged whether or not the motor actuator (i.e., ACT in FIG. 4), such as 16, 17, 18, is in operation. When the motor actuator is judged to be in operation, step 200 is followed by step 202. On the other hand, when the motor actuator is judged not to be in operation, step 200 is followed by step 204.

In step 202, the range of the amount of power supply voltage supplied to such a motor actuator is judged. When the amount of the power supply voltage exceeds 11 volts, step 202 is followed by step 204. When the amount of the power supply voltage is in a range of 8 to 11 volts, step 202 is followed by step 206. When the amount of the power supply voltage is less than 8 volts, step 202 is followed by step 208. Incidentally, in this embodiment of the present invention, a supply voltage of the vehicle battery 23 is 12 volts.

In step 204, since the amount of the power supply voltage exceeds 11 volts, it is judged that the amount of the power supply voltage is normal, whereby a tentative value m of a deviation of a turning angle of such an air-conditioning door is set at zero. After that, step 204 is followed by step 210.

On the other hand, in step 206, the tentative value m of the deviation is determined by a predetermined estimating procedure.

Figure 5:
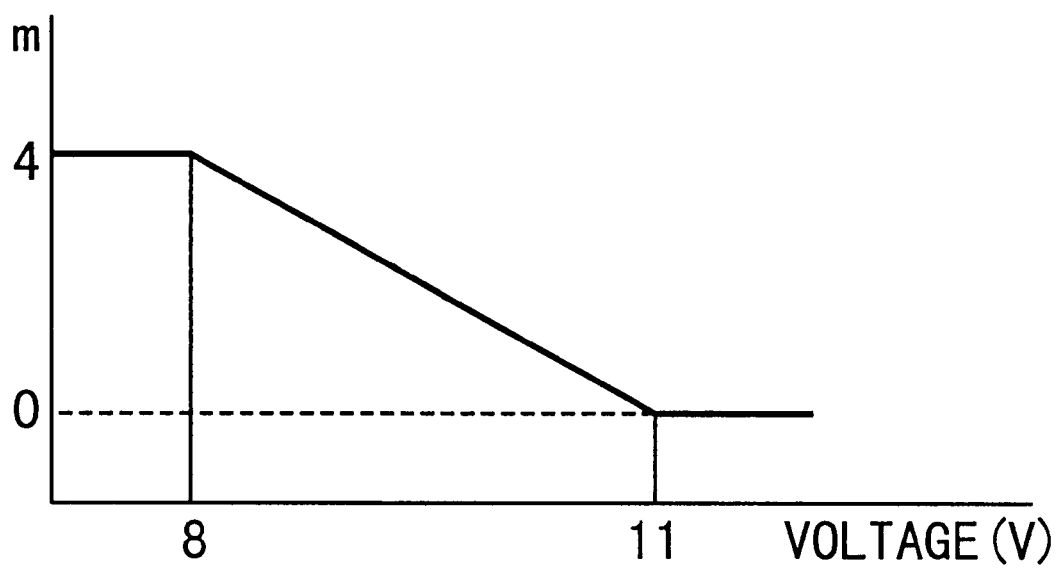
FIG. 5 is a graph showing the relationship between a tentative amount of the estimated value of the deviation and the amount of power supply voltage used in determining this tentative amount of the estimated value of the deviation.

More particularly, in the above predetermined estimating procedure of step 206, for example, a graph shown in FIG. 5 is used to determined the tentative value m of the deviation. As is clear from the graph of FIG. 5, when the amount of the power supply voltage is in the range from 8 to 11 volts, it is possible to experimentally determine the tentative value m of the deviation on the basis of the amount of the power supply voltage, as shown in the graph of FIG. 5.

After the tentative value m of the deviation is determined, step 206 is followed by step 210.

On the other hand, in step 208, the tentative value m of the deviation of the turning angle of such an air-conditioning door is set at 4 without exception. After the tentative value m of the deviation is set at 4, step 208 is followed by step 210.

In step 210, the tentative value m of the deviation thus determined in any one of the preceding steps 204, 206 and 208 is added to the estimated value S of the deviation having been determined immediately before the tentative value m is determined, whereby the sum of the tentative value m and the estimated value S forms a new estimated value S of the deviation of the turning angle of such an air-conditioning door. Incidentally, when the above step 210 is a first processing after a first occurrence of closure of the ignition switch 21 in a condition in which the accessory switch is closed, since the estimated value S of the deviation to be added to the tentative value m of the deviation is set at zero through an initial setting (i.e., initialization) made at the beginning of the program performed in the main routine of FIG. 3, the new estimated value S is equal to the tentative value m of the deviation.

When necessary, other processing is performed after this step 210. After that, the processing procedure returns to the main routine, whereby the program of this subroutine is repeated in operation.

Due to this, the estimated values S of the deviation are accumulated each time the program of the subroutine is executed. After the accessory switch 22 is opened, the last one of the estimated values S of the deviation is stored in a memory 19a which is provided in the control unit 19, as shown in FIG. 1 This memory 19a is connected with a data-holding battery 26, and, therefore may hold its data even after the control unit 19 is cut off from the vehicle battery 23 shown in FIG. 2. When the control unit 19 operates, the data-holding battery is recharged by the on-vehicle battery 23 through a power stabilizer (i.e., PS shown in FIG. 1) 19b.

As already described above, upon a first occurrence of closure of the ignition switch 21 after the accessory switch 22 is closed again, in step 102 of the main routine, the estimated value S of the deviation of the turning angle of such an air-conditioning door thus stored in the memory 19a is retrieved therefrom, and is judged whether such estimated value S exceeds the predetermined value (i.e., 10).

Consequently, in the embodiment of the present invention having the above construction, after the control unit 19 operates, it is judged, based on the estimated value S of the deviation determined when the control unit 19 starts its operation, whether or not an initial setting of the turning angle of such an air-conditioning door is required. When the initial setting is judged to be necessary, the initial setting of the turning angle of the air-conditioning door is made.

In the above embodiment of the present invention, the graph shown in FIG. 5 is an example, and, therefore may be modified in accordance with variations of power supply voltages and the like.

Further, in the above embodiment of the present invention, although standards for determining the estimated value S of the deviation of the turning angle of such an air-conditioning door are the same in any of the doors 4, 11, 15a, 15b, it is also possible to modify such standards for each of the doors.

Incidentally, in the first embodiment of the present invention described above, a judgment means for judging a driving condition of the stepping motor 24 is realized by executing both the program of the subroutine routine shown in FIG. 4 and a part (which is executed in the step 102) of the program of the main routine shown in FIG. 3. On the other hand, an initial setting means for making an initial setting of a turning angle of the air-conditioning door is realized by executing a part (which is executed in step 106 shown in FIG. 3) of the program of the main routine in the control unit 19, as shown in FIG. 3.

Now, a second embodiment of the present invention will be described with reference to FIGS. 1, 2, 6 and 7. Incidentally, the vehicle air-conditioning unit in the second embodiment of the present invention is substantially the same in construction as that shown in the first embodiment of the present invention described above, with the exception of the following different points which will be now described with reference to a program of a main routine shown in FIG. 6.

Figure 6:
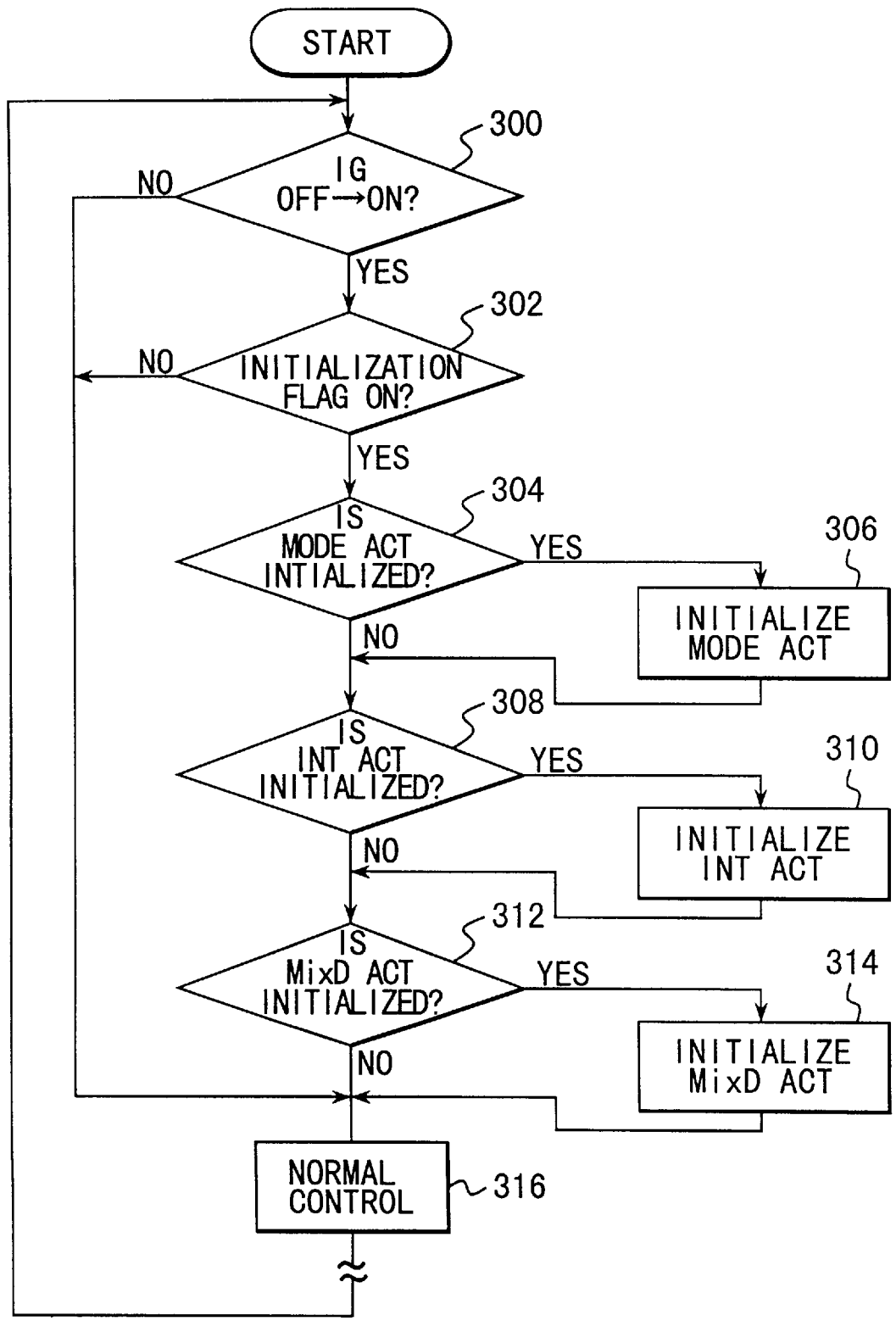
FIG. 6 is a flowchart for a main control routine executed in the control unit of the air-conditioning unit in a second embodiment of the apparatus of the present invention.

In the program of the main routine shown in FIG. 6, the processing procedure goes to step 300. In this step 300, it is judged whether or not the ignition switch 21 is switched from its open condition to its closed condition. When it is judged that the ignition switch 21 is not switched from the open condition to the closed condition (i.e., the ignition switch 21 is judged to be already closed), step 300 is followed by step 316.

On the other hand, when it is judged that the ignition switch 21 is switched from its open condition to its closed condition, step 300 is followed by step 302. In step 302, it is judged whether or not an initialization flag is on (i.e., initialization flag is of a level one).

The initialization flag is a variable for monitoring the driving condition of the air-conditioning door such as the mode doors 15a, 15b. Consequently, the initialization flag is set at the level one (1) when an initial setting of the turning angle of such an air-conditioning door is judged to be made in a subroutine (described later).

When it is judged that the initialization flag is not on (i.e., not set at the level one), i.e., when an initial setting of the turning angle of such an air-conditioning door is not required in step 302, step 302 is followed by step 316.

On the other hand, when the initialization flag is not on (i.e., not set at the level one) in step 302, step 302 is followed by step 304. In step 304, it is judged whether or not an initial setting of the turning angle of the air-conditioning door such as those 15a, 15b (i.e., an initial setting of a turning angle of a rotor of the stepping motor 24) is made.

Incidentally, in the flowchart of FIG. 6, the reference character "ACT" denotes the motor actuators such as those 16, 17, 18, When it is judged in step 304 that the initial setting of the turning angle of the motor actuator 18 for the mode doors 15a, 15b is not required since such initial setting is already made, step 304 is followed by step 308 (described later). On the other hand, when it is judged in step 304 that the initial setting of the turning angle of the motor actuator 18 for the mode doors 15a, 15b is still not made, step 304 is followed by step 306. In step 306, a predetermined number of the drive pulses are issued from the control unit 19 to the motor actuator 18, so that the initial setting of the turning angle of such an air-conditioning door is made. Then, step 306 is followed by step 308. Incidentally, after completion of the initial setting in step 306, the initialization flag is reset at a level zero (0).

In step 308 following step 304, it is judged whether or not an initial setting of a turning angle of the air-conditioning door such as the intake door 4 is made.

When it is judged in step 308 that the initial setting of the turning angle of the intake door 4 is not required since such initial setting is already made, step 308 is followed by step 312 (described later).

On the other hand, when it is judged in step 308 that the initial setting of the turning angle of the intake door 4 is still not made, step 308 is followed by step 310. In step 310, a predetermined number of the drive pulses are issued from the control unit 19 to the motor actuator 16, so that the initial setting of the turning angle of the intake door 4 is made. Then, step 310 is followed by step 312.

In step 312, it is judged whether or not an initial setting of a turning angle of the air-181 mixing door 11 is made. When such initial setting is judged to be already made, step 312 is followed by step 316.

On the other hand, in step 312, when it is judged that the initial setting of the turning angle of the air-mixing door 11 is still not made, step 312 is followed by step 314. In step 314, a predetermined number of the drive pulses are issued from the control unit 19 to the motor actuator 17. Then, step 314 is followed by step 316.

In step 316, a normal air-conditioning operation is performed. More particularly, the control unit 19 controls the motor actuators 16, 17, 18 in operation to realize a desired air-conditioning atmosphere required through the control panel 20. Further, in this normal control operation, a setting operation for setting the initialization flag for indicating the presence or absence of the initial setting of the turning angle of the air-conditioning door such as the mode doors 15a, 15b is performed in accordance with a program of one of subroutines.

After completion of the normal control operation, when necessary, other control operations are conducted. Then, the processing procedure returns to the first step 300 of main routine, as shown in FIG. 6.

Now, the program of one of the subroutines, which defines the setting operation for setting the initialization flag for indicating the presence or absence of the initial setting of the turning angle of the air-conditioning door such as the mode doors 15a, 15b, will be described with reference to a flowchart of this subroutine shown in FIG. 7.

Figure 7:
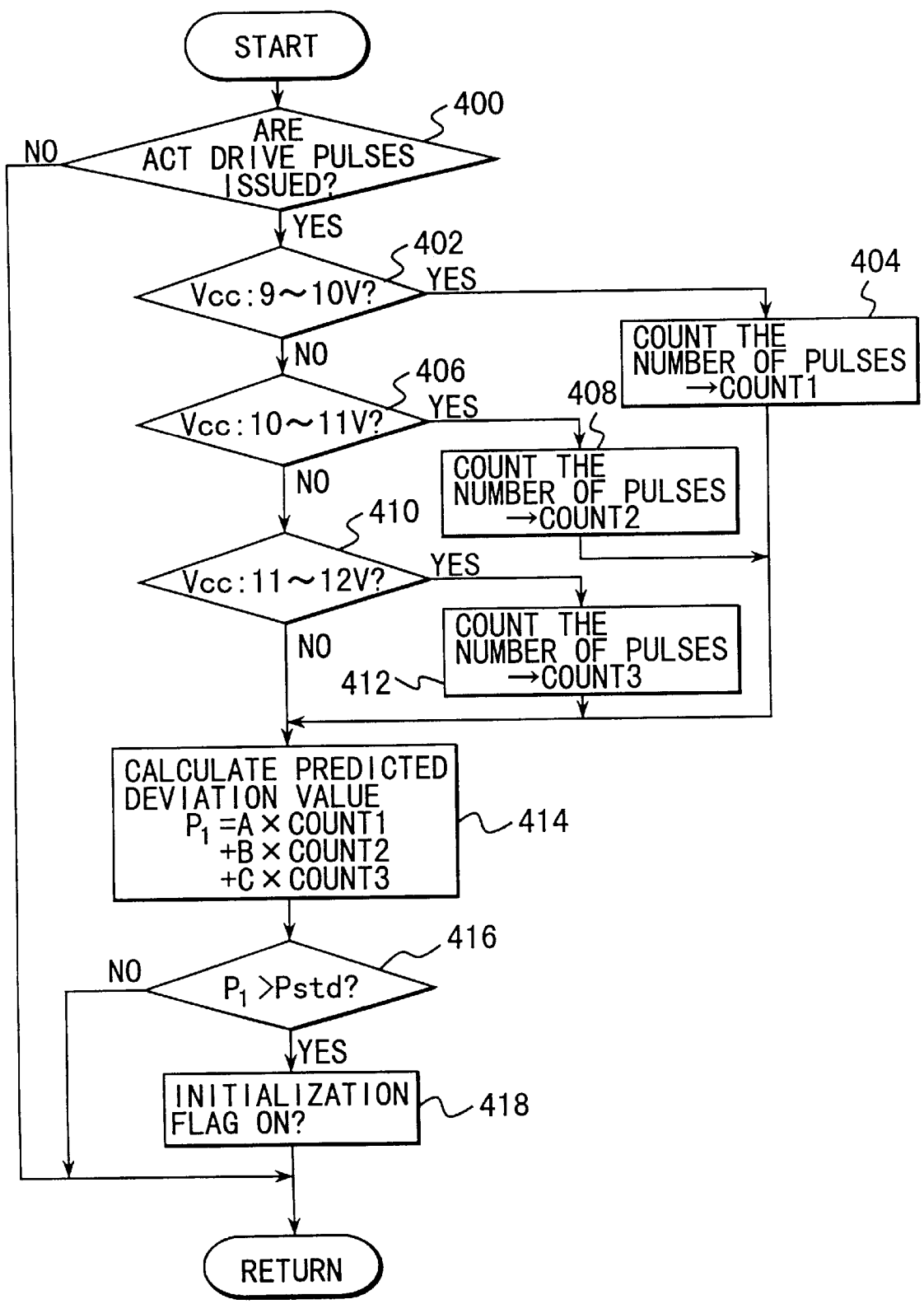
FIG. 7 is a flowchart for a subroutine which forms a part of the main control routine shown in FIG. 6 and determines whether or not an initial setting of a turning angle of the air-conditioning door is made.

In step 400 of the subroutine of FIG. 7, it is judged whether or not drive pulses for driving the motor actuator 18 are issued from the control unit 19. When it is judged that the drive pulses are still not issued, this subroutine is finished, through other processing (not shown), without executing the remaining steps of this subroutine of FIG. 7.

On the other hand, when it is judged that the drive pulses are issued, step 400 is followed by step 402. In step 402, it is judged whether or not the amount of power supply voltage supplied from the vehicle battery 23 to the motor actuator 18 is in a range of 9 to 10 volts.

When it is judged that the amount of power supply voltage is in the range of 9 to 10 volts in step 402, step 402 is followed by step 404. In step 404: the number of the drive pulse are counted; and, substitution of the thus counted number of the drive pulses into a variable "COUNT 1" is made. Then, step 404 is followed by step 414.

On the other hand, in step 402, when it is judged that the amount of power supply voltage is out of the range of 9 to 10 volts, step 402 is followed by step 406 in which it is judged whether or not the amount of power supply voltage is in a range of 10 to 11 volts. When it is judged that the amount of power supply voltage is in the range of 10 to 11 volts, step 406 is followed by step 408. In step 408: the number of the drive pulses are counted; and, substitution of the thus counted number of the drive pulses into a variable "COUNT 2" is made. After that, step 408 is followed by step 414.

Further, in step 406, when it is judged that the amount of power supply voltage is out of the range of 10 to 11 volts, step 406 is followed by step 410, as shown in FIG. 7.

In step 410, it is judged whether or not the amount of power supply voltage is in a range of from 11 to 12 volts. When it is judged that the amount of power supply voltage is in the range of from 11 to 12 volts, step 410 is followed by step 412. In step 412: the number of the drive pulses are counted; and, substitution of the thus counted number of the drive pulses into a variable "COUNT 3" is made. Then, step 412 is followed by step 414.

Further, in step 410, when it is judged that the amount of power supply voltage is out of the range of 11 to 12 volts, step 410 is followed by step 414.

Calculated in step 414 is a predicted deviation value representing a possible deviation of a turning angle of the air-conditioning door such as those 4, 11, 15a, 15b.

More particularly, as shown in FIG. 7, a predicted deviation value P1 is calculated as follows:

$$P1 = A \times (\text{COUNT 1}) + B \times (\text{COUNT 2}) + C \times (\text{COUNT 3})$$

where A, B and C are constants which will be determined as follows.

Figure 8:
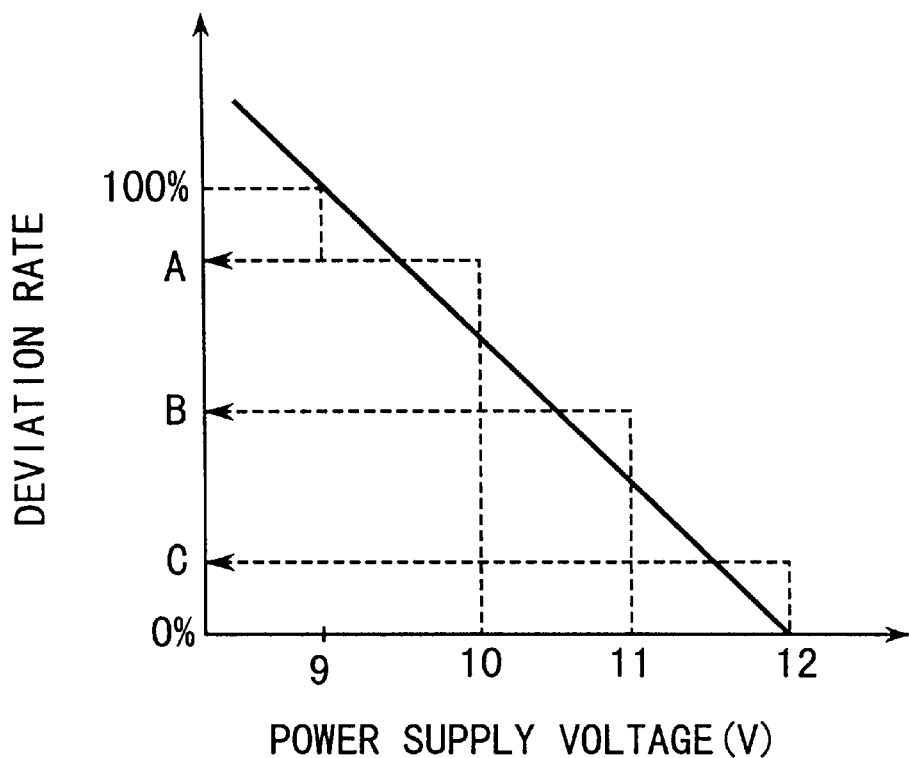
FIG. 8 is a graph showing the relationship between a deviation rate in turning angle of the rotor and the amount of power supply voltage used in determining whether the initial setting of a turning angle of the air-conditioning door is made.

These constants A, B, C represent deviation rates of the stepping motor 24 corresponding to the amount of power supply voltage, and are, for example, determined on the basis of a graph shown in FIG. 8.

As is clear from the graph of FIG. 8, when the amount of power supply voltage is in the range of 9 to 10 volts, the deviation rate is defined as A. When the amount of power supply voltage is in the range of from 10 to 11 volts, the deviation rate is defined as B. And, when the amount of power supply voltage is in the range of from 11 to 12 volts, the deviation rate is defined as C.

In this case, a concrete figure of each of the constants A, B, C depends on the properties of each individual stepping motor 24, a weight of each individual air-conditioning door such as those 4, 11, 15a, 15b and like factors. Consequently, it is preferable to determine these constants A, B, C through experiments.

After the predicted deviation value P1 is determined in a manner described above, it is judged in step 416 whether or not the predicted deviation value P1 is larger than a predetermined value "Pstd".

Figure 9:
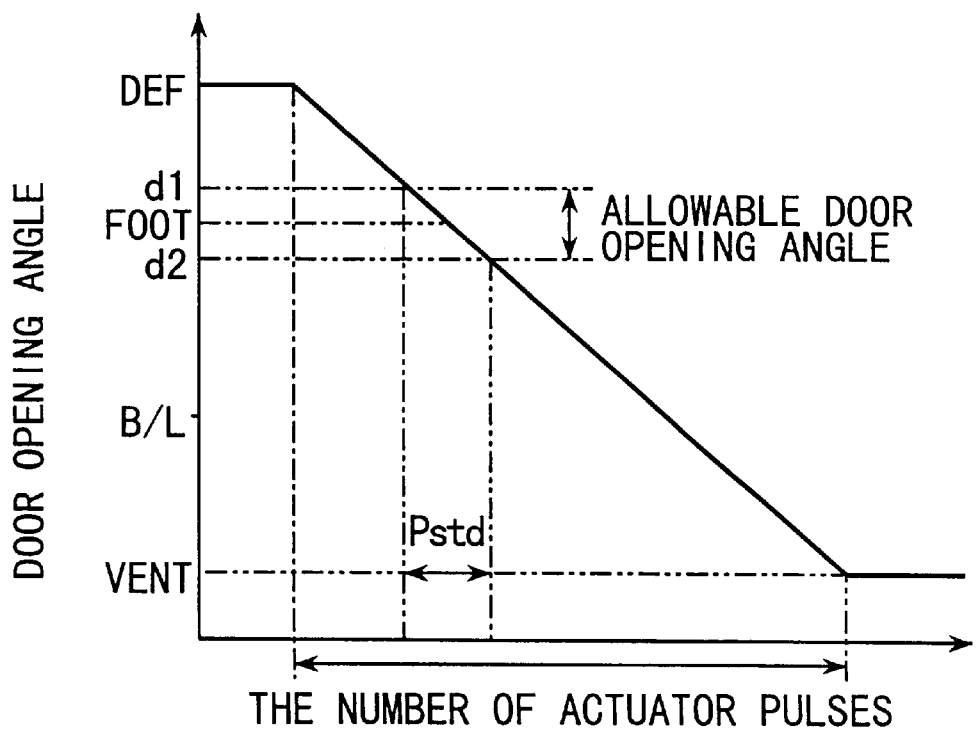
FIG. 9 is a graph showing the relationship between an opening angle of the air-conditioning door and the number of actuator pulses used in determining whether the initial setting of the turning angle of the air-conditioning door is made.

In this case, the predetermined value "Pstd" is, for example, determined on the basis of a graph shown in FIG. 9.

More particularly, the graph of FIG. 9 shows the relationship between: an opening angle of the air-conditioning door such as those 4, 11, 15a, 15b; and, the number of drive pulses supplied to the stepping motor 24. For example, with respect to the mode doors 15a, 15b, these doors 15a, 15b may assume any one of a defroster (DEF) ventilation position, a foot (FOOT) ventilation position, and a vent (VENT) ventilation position. In this order of the ventilation positions, the number of the drive pulses supplied to the stepping motor 24 is gradually reduced.

On the other hand, the predetermined value "Pstd" represents the number of drive pulses corresponding to a largest possible opening angle of the air-conditioning door in each individual door's turning angle.

For example, in the graph of FIG. 9 wherein the turning angle of the air-conditioning door such as those 15a, 15b assumes the foot (FOOT) ventilation position, when an allowable deviation of the turning angle of the air-conditioning door such as those 15a, 15b is in a range from an opening angle d1 to an opening angle d2, the predetermined value "Pstd" corresponds to a difference between: the drive pulses corresponding to the opening angle d1; and, the drive pulses corresponding to the opening angle d2.

Incidentally, in this embodiment of the present invention, with respect to the remaining ventilation positions DEF, B/L, VENT of the air-conditioning door such as those 15a, 15b, the allowable opening angle of the air-conditioning door in these ventilation positions are equal to that of the FOOT ventilation position, so that the same predetermined value "Pstd" is used in these ventilation positions.

Consequently, in step 416, when it is judged that the predicted deviation value P1 exceeds the predetermined value "Pstd", since it is necessary to make an initial setting of the turning angle of the air-conditioning door such as those 15a, 15b, step 416 is followed by step 418. In step 418, the initialization flag is set at the level one (1), which makes the initialization flag on.

After completion of execution of step 418, the processing procedure returns to the main routine (omitted in FIG. 7), if necessary.

Consequently, in this case: at first, the predicted deviation value corresponding to the number of the drive pulses supplied to the stepping motor 24 is determined; and, when this predicted deviation value exceeds the predetermined value, the initial setting of the turning angle of the air-conditioning door is made. Consequently, in the embodiment of the present invention, there is no fear that the initial setting of the turning angle of the air-conditioning door is forcibly made when it is not required, which enables the initial setting of the turning angle of the air-conditioning door to be efficiently made.

Incidentally, the graphs shown in FIGS. 8 and 9 are mere examples, and, therefore may be modified in each individual application.

In the second embodiment of the present invention shown in FIG. 6, the judgment means for judging the driving condition of the stepping motor 24 is realized in the control unit 19 by executing the program of the subroutine shown in FIG. 7. On the other hand, the initial setting means for making the initial setting of the turning angle of the air-conditioning door such as those 4, 11, 15a, 15b is realized in the control unit 19 by executing the program of step 306 in the main routine shown in FIG. 6.

Figure 10:
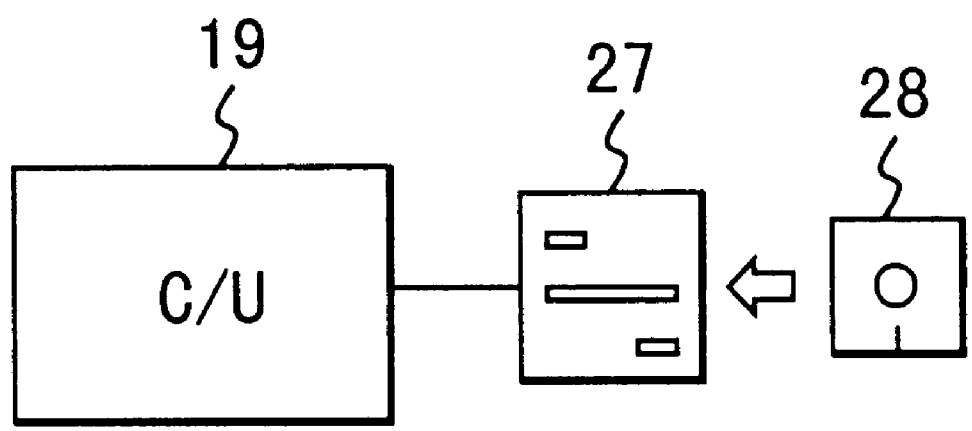
FIG. 10 is a schematic block diagram of the control unit connected with a floppy disk drive unit which receives a floppy disk to retrieve program therefrom.

Incidentally, in the above description, although the programs for controlling the on-vehicle stepping motor 24 through the processing procedures shown in FIGS. 3, 4, 6 and 7 are previously stored in the control unit 19, it is also possible to store the above programs in a separate recording medium, for example such as a floppy disk 28 shown in FIG. 10. In use, as shown in FIG. 10, the floppy disk 28 is loaded into a floppy disk drive unit 27, so that the programs stored in the floppy disk 28 are retrieved from the disk 28 and inputted to the control unit 19.

The recording medium may be any one of the floppy disk 28, magnetic tapes, hard disks and the like.

What is claimed is:

1. A stepping motor drive control method for an air-conditioning door in a vehicle air conditioning system, for controlling at least one stepping motor to which a drive pulse corresponding to a desired air conditioning state is supplied from a control unit of the vehicle air conditioning system to rotate the air-conditioning door, the method comprising:

judging a power supply voltage level if the stepping motor is driven, to obtain a judging result;

deciding a tentative value of deviation as an index indicating an extent of deviation in a rotational position of the air-conditioning door, according to the judging result;

accumulating the tentative value of deviation every time the tentative value of deviation is decided, to then set an accumulated value as an estimated value of deviation; and supplying a predetermined drive pulse to the stepping motor to rotate the air-conditioning door into an initial standard position if the estimated value of deviation is greater than a predetermined value;

wherein the tentative value of deviation is predetermined according to a fluctuation in the power supply voltage, based on a degree of deviation in the rotational position of the air-conditioning door, which is caused by the fluctuation in the power supply voltage supplied to the stepping motor.

2. A stepping motor drive control method for an air-conditioning door in a vehicle air conditioning system, according to claim 1, wherein the tentative value of deviation is set to zero if it is decided that the power supply voltage of the stepping motor is greater than a first predetermined value, the tentative value of deviation is set on the basis of the power supply voltage amount if it is decided that the power supply voltage of the stepping motor is within a second predetermined range, and the tentative value of deviation is set to a predetermined deviation value if it is decided that the power supply voltage of the stepping motor is less than a third predetermined value, the predetermined deviation value being a maximum value or more of the tentative value of deviation which is set when the power supply voltage of the stepping motor is within the second predetermined range.

3. A stepping motor drive control method for an air-conditioning door in a vehicle air conditioning system, for controlling at least one stepping motor to which a drive pulse corresponding to a desired air conditioning state is supplied from a control unit of the vehicle air conditioning system to rotate the air-conditioning door, the method comprising:

judging a power supply voltage level every time the stepping motor is driven while a power supply voltage is supplied to the stepping motor, to obtain a judging result;

deciding a tentative value of deviation as an index indicating an extent of deviation in a rotational position of the air-conditioning door according to the judging result every time the judging result is obtained, the tentative value of deviation being predetermined according to a fluctuation in the power supply voltage based on a degree of deviation in the rotational position of the air-conditioning door, which is caused by the fluctuation in the power supply voltage supplied to the stepping motor;

accumulating the tentative value of deviation every time the tentative value of deviation is decided, to then set an accumulated value as an estimated value of deviation;

storing the estimated value of deviation when supply of the power supply voltage to the control unit is shut off;

deciding whether the stored estimated value of deviation exceeds a predetermined value, immediately after the power supply voltage is supplied to the control unit again; and supplying a predetermined drive pulse to the stepping motor to rotate the air-conditioning door into an initial standard position if it is decided that the estimated value of deviation exceeds the predetermined value.

4. A stepping motor drive control method for an air-conditioning door in a vehicle air conditioning system, according to claim 3, wherein the tentative value of deviation is set to zero if it is decided that the power supply voltage of the stepping motor is greater than a first predetermined value, the tentative value of deviation is set on the basis of the power supply voltage amount if it is decided that the power supply voltage of the stepping motor is within a second predetermined range, and the tentative value of deviation is set to a predetermined deviation value if it is decided that the power supply voltage of the stepping motor is less than a third predetermined value, the predetermined deviation value being a maximum value or more of the tentative value of deviation which is set when the power supply voltage of the stepping motor is within the second predetermined range.

5. A stepping motor drive control method for an air-conditioning door in a vehicle air conditioning system, for controlling at least one stepping motor to which a drive pulse corresponding to a desired air conditioning state is supplied from a control unit of the vehicle air conditioning system to rotate the air-conditioning door, the method comprising:

judging a power supply voltage level every time the stepping motor is started by receiving supply of a drive pulse from the control unit, to obtain a judging result;

counting a number of the drive pulses supplied from the control unit to the stepping motor every time the judging result is obtained, and then substituting a counted value into a first counting value if the power supply voltage is within a first predetermined range, or substituting the counted value into a second counting value if the power supply voltage is within a second predetermined range, or substituting the counted value into a third counting value if the power supply voltage is within a third predetermined range;

calculating a sum of a multiplied value of the first counting value and a first predetermined coefficient, a multiplied value of the second counting value and a second predetermined coefficient and a multiplied value of the third counting value and a third predetermined coefficient, and then setting the sum as a predictive deviation value indicating a possible step error of the stepping motor;

judging whether the predictive deviation value exceeds a predetermined value; and supplying a predetermined drive pulse to the stepping motor to rotate the air-conditioning door into an initial standard position if the predictive deviation value exceeds the predetermined value;

wherein the first, second and third predetermined coefficients are previously determined values which correspond to the possible step error in the stepping motor according to a magnitude of the power supply voltage supplied to the stepping motor.

6. A stepping motor drive control method for an air conditioning door in a vehicle air conditioning system, according to claim 5, wherein the predetermined value is a drive pulse number related to an allowable air-conditioning door opening which is based on a predetermined relation between an air-conditioning door opening and the drive pulse supplied to the stepping motor from the control unit, and the allowable air-conditioning door opening is set to a predetermined allowable deviation.

7. A stepping motor control system for controlling a stepping motor which is used to rotate an air-conditioning door in a vehicle air conditioning system, the stepping motor control system comprising:

a control unit for supplying a drive pulse corresponding to a desired air-conditioning state to the stepping motor;

a judging means for judging a power supply voltage level if the stepping motor is driven, to obtain a judging result;

a decision means for deciding a tentative value of deviation as an index indicating an extent of deviation in a rotational position of the air-conditioning door, according to the judging result;

an accumulating means for accumulating the tentative value of deviation every time the tentative value of deviation is decided, to then set an accumulated value as an estimated value of deviation; and supplying means for supplying a predetermined drive pulse to the stepping motor to rotate the air-conditioning door into an initial standard position if the estimated value of deviation is more than a predetermined value;

wherein the tentative value of deviation is predetermined according to a fluctuation in the power supply voltage, based on a degree of deviation in the rotational position of the air-conditioning door, which is caused by the fluctuation in the power supply voltage supplied to the stepping motor.

8. A stepping motor control system according to claim 7, wherein the tentative value of deviation is set to zero if it is decided that the power supply voltage of the stepping motor is greater than a first predetermined value, the tentative value of deviation is set on the basis of the power supply voltage amount if it is decided that the power supply voltage of the stepping motor is within a second predetermined range, and the tentative value of deviation is set to a predetermined deviation value if it is decided that the power supply voltage of the stepping motor is less than a third predetermined value, the predetermined deviation value being a maximum value or more of the tentative value of deviation which is set when the power supply voltage of the stepping motor is within the second predetermined range.

9. A stepping motor control system for controlling a stepping motor which is used to rotate an air-conditioning door in a vehicle air conditioning system, the stepping motor control system comprising:

a control unit including a memory device, and a power supply which can supply a power supply voltage to the memory device after the power supply for the control unit is shut off, and the control unit is for supplying a drive pulse to the stepping motor, corresponding to a desired air-conditioning state;

a judging means for judging a power supply voltage level every time the stepping motor is driven while the power supply voltage is supplied to the stepping motor, to obtain a judging result;

a decision means for deciding a tentative value of deviation as an index indicating an extent of deviation in a rotational position of the air-conditioning door according to the judging result every time the judging result is obtained, the tentative value of deviation being predetermined according to a fluctuation in the power supply voltage based on a degree of deviation in the rotational position of the air-conditioning door which is caused by the fluctuation in the power supply voltage supplied to the stepping motor;

an accumulating means for accumulating the tentative value of deviation every time the tentative value of deviation is decided, to then set an accumulated value as an estimated value of deviation;

the memory device for storing the estimated value of deviation when supply of the power supply voltage to the control unit is shut off;

a decision means for deciding whether the stored estimated value of deviation exceeds a predetermined value, immediately after the power supply voltage is supplied to the control unit again; and a supplying means for supplying a predetermined drive pulse to the stepping motor to rotate the air-conditioning door into an initial standard position if it is decided that the estimated value of deviation exceeds the predetermined value.

10. A stepping motor control system, according to claim 9, wherein the tentative value of deviation is set to zero if it is decided that the power supply voltage of the stepping motor is greater than a first predetermined value, the tentative value of deviation is set on the basis of the power supply voltage amount decided that the power supply voltage of the stepping motor is within a second predetermined range, and the tentative value of deviation is set to a predetermined deviation value if it is decided that the power supply voltage of the stepping motor is less than a third predetermined value, the predetermined deviation value being a maximum value or more of the tentative value of the deviation which is set when the power supply voltage of the stepping motor is within the speed predetermined range.

11. A stepping motor control system for controlling stepping motor which is used to rotate an air-conditioning door in a vehicle air conditioning system, the stepping motor control system comprising:

a control unit including a memory device, and a power supply which can supply a power supply voltage to the memory device aft e r the power supply for the control unit is shut off, and the control unit is for supplying a drive pulse to the stepping motor, corresponding to a desired air-conditioning state;

a judging means for a power supply voltage level every time the stepping motor is started by receiving supply of a drive pulse from the control unit, to obtain a judging result;

a counting means for counting a number of the drive pulses supplied from the control unit to the stepping motor every time the judging result is obtained, and then substituting a counted value into a first counting value the power supply voltage is within a first predetermined range, or substituting the counted value into a second counting value if the power supply voltage is within a second predetermined range, or substituting the counted value into a third counting value if the power supply voltage is within a third predetermined range;

a calculating means for calculating a sum of a multiplied value of the first predetermined coefficient, a multiple value of the second counting value and a second predetermined coefficient and a multiplied value of the third counting value and a third predetermined coefficient, and then setting the sum as a predictive deviation value indicating a possible step error of the stepping motor;

a predictive deviation value judging means for judging whether the predictive deviation value exceeds a predetermined value; and a supplying means for supplying a predetermined drive pulse to the stepping motor to rotate the air-conditioning door into an initial standard position if it is decided that the predictive deviation value exceeds the predetermined value;

wherein the first, second and third predetermined coefficients are previously determined values which correspond to the possible step error in the stepping motor according to a magnitude of the power supply voltage supplied to the stepping motor.

12. A stepping motor control system, according to claim 11, wherein the predetermined value is a drive pulse number related to an allowable air-conditioning door opening which is based on a predetermined relation between an air-conditioning door opening and the drive pulse supplied to the stepping motor from the control unit, and the allowable air-conditioning door opening is set to a predetermined allowable deviation.

13. A computer-readable medium having a computer-readable executable stepping motor drive control program for an air-conditioning door in a vehicle air conditioning system, stored thereon, for controlling at least one stepping motor to which a drive pulse corresponding to a desired air conditioning state is supplied from a control unit of the vehicle air conditioning system to rotate the air-conditioning door, the program including:

a step of judging a power supply voltage level if the stepping motor is driven, to obtain a judging result;

a step of deciding a tentative value of deviation as an index indicating an extent of deviation in a rotational position of the air-conditioning door, according to the judging result;

a step of accumulating the tentative value of deviation every time the tentative value of deviation is decided, to then set an accumulated value as an estimated value of deviation; and a step of supplying a predetermined drive pulse to the stepping motor to rotate the air-conditioning door into an initial standard position if the estimated value of deviation is greater than a predetermined value;

wherein the tentative value of deviation is predetermined according to a fluctuation in the power supply voltage, based on a degree of deviation in the rotational position of the air-conditioning door, which is caused by the fluctuation in the power supply voltage supplied to the stepping motor.

14. A computer-readable medium having a computer-readable executable stepping motor drive control program for an air-conditioning door in a vehicle air conditioning system, stored thereon, according to claim 13, wherein the tentative value of deviation is set to zero if it is decided that the power supply voltage of the stepping motor is greater than a first predetermined value, the tentative value of deviation is set on the basis of the power supply voltage amount if it is decided that the power supply voltage of the stepping motor is within a second predetermined range, and the tentative value of deviation is set to a predetermined deviation value if it is decided that the power supply voltage of the stepping motor is less than a third predetermined value, the predetermined deviation value being a maximum value or more of the tentative value of deviation which is set when the power supply voltage of the stepping motor is within the second predetermined range.

15. A computer-readable medium having a computer-readable executable stepping motor drive control program for an air-conditioning door in a vehicle air conditioning system, stored thereon, for controlling at least one stepping motor to which a drive pulse corresponding to a desired air conditioning state is supplied from a control unit of the vehicle air conditioning system to rotate the air-conditioning door, the program including:

a step of judging a power supply voltage level every time the stepping motor is driven while a power supply voltage is supplied to the stepping motor, to obtain a judging result;

a step of deciding a tentative value of deviation as an index indicating an extent of deviation in a rotational position of the air-conditioning door according to the judging result every time the judging result is obtained, the tentative value of deviation being predetermined according to a fluctuation in the power supply voltage based on a degree of deviation in the rotational position of the air-conditioning door, which is caused by the fluctuation in the power supply voltage supplied to the stepping motor;

a step of accumulating the tentative value of deviation every time the tentative value of deviation is decided, to then set an accumulated value as an estimated value of deviation;

a step of storing the estimated value of deviation when supply of the power supply voltage to the control unit is shut off;

a step of deciding whether the stored estimated value of deviation exceeds a predetermined value, immediately after the power supply voltage is supplied to the control unit again; and a step of supplying a predetermined drive pulse to the stepping motor to rotate the air-conditioning door into an initial standard position if it is decided that the estimated value of deviation exceeds the predetermined value.

16. A computer-readable medium having a computer-readable executable stepping motor drive control program for an air-conditioning door in a vehicle air conditioning system, stored thereon, according to claim 15, wherein the tentative value of deviation is set to zero if it is decided that the power supply voltage of the stepping motor is greater than a first predetermined value, the tentative value of deviation is set on the basis of the power supply voltage amount if it is decided that the power supply voltage of the stepping motor is within a second predetermined range, and the tentative value of deviation is set to a predetermined deviation value if it is decided that the power supply voltage of the stepping motor is less than a third predetermined value, the predetermined deviation value being a maximum value or more of the tentative value of deviation which is set when the power supply voltage of the stepping motor is within the second predetermined range.

17. A computer-readable medium having a computer-readable executable stepping motor drive control program for an air-conditioning door in a vehicle air conditioning system, stored thereon, for controlling at least one stepping motor to which a drive pulse corresponding to a desired air conditioning state is supplied from a control unit of the vehicle air conditioning system to rotate the air-conditioning door, the program including:

a step of judging a power supply voltage level every time the stepping motor is started by receiving supply of a drive pulse from the control unit, to obtain a judging result; counting a number of the drive pulses supplied from the control unit to the stepping motor every time the judging result is obtained, and then substituting a counted value into a first counting value if the power supply voltage is within a first predetermined range, or substituting the counted value into a second counting value if the power supply voltage is within a second predetermined range, or substituting the counted value into a third counting value if the power supply voltage is within a third predetermined range;

a step of calculating a sum of a multiplied value of the first counting value and a first predetermined coefficient, a multiplied value of the second counting value and a second predetermined coefficient and a multiplied value of the third counting value and a third predetermined coefficient, and then setting the sum as a predictive deviation value indicating a possible step error of the stepping motor;

a step of judging whether the predictive deviation value exceeds a predetermined value; and a step of supplying a predetermined drive pulse to the stepping motor to rotate the air-conditioning door into an initial standard position if the predictive deviation value exceeds the predetermined value;

wherein the first, second and third predetermined coefficients are previously determined values which correspond to the possible step error in the stepping motor according to a magnitude of the power supply voltage supplied to the stepping motor.

18. A computer-readable medium having a computer-readable executable stepping motor drive control program for an air-conditioning door in a vehicle air conditioning system, stored thereon, according to claim 17, wherein the predetermined value is a drive pulse number related to an allowable air-conditioning door opening which is based on a predetermined relation between an air-conditioning door opening and the drive pulse supplied to the stepping motor from the control unit, and the allowable air-conditioning door opening is set to a predetermined allowable deviation.

* * * * *